Patented June 29, 1954

2,682,558

UNITED STATES PATENT OFFICE 2,682,558

PREPARATION OF THIOFORMAMIDE

William R. Schmitz, Grand Island, N. Y., assignor to E. I. du Pont de Nemours and Company, Wilmington, Del., a corporation of Delaware No Drawing. Application February 20, 1952, Serial No. 272,693

8 Claims. (Cl. 260—551)

This invention relates to the preparation of thioformamide by the reaction of formamide with phosphorus pentasulfide in accordance with the following equation:

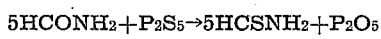
$$5HCONH_2 + P_2S_5 \rightarrow 5HCSNH_2 + P_2O_5$$

Thioformamide is useful for various purposes, particularly as an intermediate in the preparation of other chemical compounds. Thus, it may be reacted with 2,3-dichlorotetrahydro-2-methylfuran, or with the corresponding dibromo compound, to obtain 4-methyl-5-($\beta$-hydroxyethyl)-thiazole as disclosed in the application of Londergan and Schmitz, S. N. 272,694, filed February 20, 1952, now U. S. Patent 2,654,760. This thiazole is of value as an intermediate in the preparation of vitamin $B_1$.

Thioformamide has most frequently been prepared by the procedure of Willstätter and Wirth, Ber. 42, 1911 (1909), which involves the reaction of formamide with phosphorus pentasulfide in small proportions. Various modifications of this early method have been proposed such as the use of diethyl ether as a reaction medium. However, the yields obtained by such methods have been relatively low and the thioformamide obtained usually is contaminated considerably by unreacted materials or by-products. Furthermore, when carried out in the absence of a suitable solvent, the reaction frequently is slow in starting, but once started it proceeds vigorously so that effective control is difficult when the reaction is carried out on any appreciable scale.

It is an object of the present invention to provide an improved method of preparing thioformamide. It is a particular object to prepare this compound by an improved method involving the reaction of phosphorus pentasulfide with formamide, whereby the reaction proceeds smoothly and the product can be obtained in good yields and purity. Other objects of the invention will be apparent from the following description.

The above objects are accomplished in accordance with the invention by reacting phosphorus pentasulfide with formamide dissolved in tetrahydrofuran. Formamide is soluble in tetrahydrofuran in all proportions so that by the presence of the latter in the reaction medium the formamide will always be present in solution. This is of considerable advantage when compared with the prior use of diethyl ether as reaction medium, since formamide is practically insoluble in diethyl ether and, therefore, the presence of the latter does not facilitate the reaction between formamide and phosphorus pentasulfide. The solubility of formamide in tetrahydrofuran also provides better contact with the phosphorus pentasulfide, assures a smooth reaction and improves the yield obtainable.

In practicing the invention, the two reactants can be brought together in any desired manner in a reaction medium containing the tetrahydrofuran. Preferably, the formamide to be reacted is first dissolved in the tetrahydrofuran and the phosphorus pentasulfide is then added in finely divided form to the resulting solution during the course of the reaction so that fresh pentasulfide will always be available in the reaction mixture. There is generally produced, regardless of the manner of the addition of the reactants, some tarry or resinous by-products, probably polymers of sulfur or sulfur compounds, and these by-products have a tendency to coat the particles of the phosphorus pentasulfide. Addition of fresh pentasulfide during the course of the reaction insures the continued presence of uncoated pentasulfide particles, thereby facilitating a more rapid and smooth reaction and better yields.

The phosphorus pentasulfide is preferably added gradually during the course of the reaction, e. g., by adding about 10–20% of the total amount about every 15 minutes. The total amount of the pentasulfide to be used may be varied considerably but it will usually be desirable to employ from about 0.08 to 0.4 mole of the pentasulfide per mole of formamide. It is preferred to employ at least theoretical amounts of the sulfide, the most preferred procedure being to use an amount equal to an excess of about 5–25% over that amount theoretically required to react with all of the formamide used. Amounts of the pentasulfide smaller than those mentioned can of course be used, in which case correspondingly lower conversion of formamide to thioformamide will result and the tendency for the product to be contaminated with formamide will be increased. Larger amounts of the pentasulfide than those mentioned can be used but no particular advantages result from such practice.

When the reaction is carried out in the absence of a solvent for either reactant, the reaction is frequently difficult to start, but once started, it usually proceeds too rapidly with formation of large amounts of by-products and with poor conversion to thioformamide. The use of tetrahydrofuran as a solvent for formamide in the reaction mixture results in the reaction proceeding smoothly and at a controllable rate with markedly reduced amount of by-products and correspondingly increased conversion to thioformamide. Ordinarily at least one part of tetrahydrofuran will be employed for each part by weight of formamide being reacted. Lesser amounts of the solvent can be used but with only minor advantages resulting. Amounts ranging from 1–20 parts by weight of the solvent per part of formamide generally will be used. Larger amounts of the solvent can be employed but no additional advantages result from such larger amounts. The preferred weight ratios of solvent to formamide range from about 7:1 to about 13:1 since within these limits the advantages attending the use of tetrahydrofuran as solvent to formamide range from about 7:1 to phorus pentasulfide can be added as a suspension in tetrahydrofuran to a solution of formamide in tetrahydrofuran. All tetrahydrofuran used should be taken into account in calculating the weight ratio of solvent to formamide.

The reaction will generally be carried out at approximately room temperature, e. g., 20–40° C. Lower temperatures, e. g., down to about 0° C., can be used but at such lower temperatures the reaction generally proceeds too slowly. Higher temperatures e. g., up to about 65° C. can be used but are not generally desirable because they promote decomposition reactions.

In one method of operation, the phosphorus pentasulfide is added in finely divided form to an agitated solution of the formamide in tetrahydrofuran at such a rate that the reaction mixture will be maintained within the preferred temperature range noted. If desired the rate of addition of the pentasulfide may be increased by cooling the reaction mixture in any desired manner so as to avoid temperatures higher than are desired. It is generally advantageous to agitate the reaction medium for a period of time, e. g., 2–24 hours, preferably 5–6 hours, after all the pentasulfide has been added, in order to insure completion of the reaction.

The thioformamide may be separated from the reaction mixture by usual methods. Generally the solution of product in tetrahydrofuran will be decanted or filtered from resinous by-products and any unreacted phosphorus pentasulfide, and the tetrahydrofuran solvent will then be vaporized from the resulting solution of the product under reduced pressure. The crude residue obtained can be preferentially extracted by means of a solvent such as diethyl ether in which thioformamide is soluble and formamide and the by-products of the reaction are insoluble. The extracting solvent can then be stripped from the extract to leave the thioformamide as a residue in relatively pure form. Better purification of the thioformamide can be accomplished if desired by recrystallization from a solvent such as ethyl acetate. Another method of separating the thioformamide from the reaction medium involves stripping off the tetrahydrofuran, washing the resulting residue with petroleum ether and then extracting the impure product with a solvent such as diethyl ether or ethyl acetate from which the thioformamide can be separated by crystallization methods.

The invention is illustrated by the following examples:

*Example 1*

In a 5-liter three-necked flask equipped with a mechanical stirrer and a thermometer, there were placed 2665 g. (3 liters) of tetrahydrofuran and 300 g. (6.67 moles) of formamide. Phosphorus pentasulfide, 330 g. (1.49 moles), was added to the resulting solution with rapid stirring in about 50 g. portions during 1.5 hours while maintaining the temperature in the reaction mixture at 30–35° C. by periodically cooling the reaction flask by means of an ice-bath. After all the pentasulfide had been added, the reaction mixture was stirred at room temperature for 6 hours. A sticky solid by-product which gradually formed in the mixture was collected on a filter paper and discarded. The tetrahydrofuran was vaporized from the mixture under reduced pressure, leaving a residue containing thioformamide, resinous by-products and possibly some unreacted formamide. This residue was extracted with an equal part by weight of diethyl ether. Vaporization of the ether from the resulting extract gave a residue consisting of 201 g. of thioformamide, corresponding to a 50% conversion based on the formamide charged.

*Example 2*

Formamide, 100 g. (2.22 moles), and 100 g. (0.45 mole) of phosphorus pentasulfide were reacted in 888 g. (1 liter) of tetrahydrofuran substantially as described in Example 1. After the tetrahydrofuran had been stripped from the mixture of reaction products the resulting residue was washed with petroleum ether and then crystallized from 350 ml. of ethyl acetate at about −70° C. The solid thioformamide so obtained was quickly collected on a filter and then transferred to a vacuum desiccator to remove the remainder of the solvent. The thioformamide obtained in this manner corresponded to a 61% conversion based on the formamide charged.

*Example 3*

The general procedure of Example 1 was repeated employing 100 g. of formamide, 100 g. of phosphorus pentasulfide and about 715 g. (1 liter) of diethyl ether, the latter being employed in place of tetrahydrofuran. In this case, the thioformamide obtained corresponded to a conversion of only 23%.

*Example 4*

The general procedure of Example 1 was repeated employing 100 g. of formamide and 100 g. of phosphorus pentasulfide, except that no solvent was employed in the reaction medium. The phosphorus pentasulfide was added in increments over a period of about 1.5 hours to the formamide. In this case, the reaction mixture polymerized and no thioformamide was obtained.

*Example 5*

The reaction was carried out in the general manner described in Example 1 employing 100 g. each of formamide and phosphorus pentasulfide but only 222 g. (250 ml.) of tetrahydrofuran. In this case, the conversion of formamide to thioformamide was 28%.

For most purposes it will be preferred to employ thioformamide in relatively pure form, in which case the crude thioformamide can be purified in any desired manner. Purification generally will be effective when carried out by the preferential extraction of thioformamide from the reaction mixture, as illustrated in the examples, but other purification procedures may be used. In many cases the crude product, e. g., the residue remaining after the solvent has been stripped from the reaction mixture, can be used without purification.

I claim:

1. The method of preparing thioformamide comprising reacting phosphorus pentasulfide with formamide dissolved in tetrahydrofuran, the weight ratio of tetrahydrofuran to formamide in the reaction medium being at least 1:1.

2. The method of claim 1 wherein the weight ratio of tetrahydrofuran to formamide is in the range of from about 7:1 to about 13:1.

3. The method of claim 1 wherein the reaction medium contains tetrahydrofuran in an amount equal on a weight basis to 1–20 parts of tetrahydrofuran per part of formamide employed.

4. The method of claim 1 wherein the reaction is carried out by adding the phosphorus pentasulfide to a solution of formamide in tetrahydrofuran, in which solution the weight ratio of tetrahydrofuran to formamide is in the range of 1:1 to 20:1.

5. The method of claim 4 employing an amount of phosphorus pentasulfide which is at least stoichiometrically equal to the amount of formamide employed.

6. The method of claim 5 wherein a 5–25% excess of phosphorus pentasulfide is employed.

7. The method of preparing thioformamide comprising adding phosphorus pentasulfide to an agitated solution of formamide in tetrahydrofuran, said solution containing at least 1 part by weight of tetrahydrofuran per part by weight of formamide, vaporizing said tetrahydrofuran from the resulting reaction mixture after completion of the reaction, preferentially extracting thioformamide from the residue thus obtained and separating thioformamide from the resulting extract.

8. The method of claim 7 wherein the thioformamide is finally crystallized from ethyl acetate.

References Cited in the file of this patent

UNITED STATES PATENTS

| Number | Name | Date |
|---|---|---|
| 2,265,212 | Westphal et al. | Dec. 9, 1941 |

OTHER REFERENCES

Willstatter et al., "Ber. deut. Chem.," vol. 42 (1909), pp. 1911, 1912 and 1920.

Erlenmeyer et al., "Helv. Chim. Acta," vol. 31, (1948) pp. 2071–2.